April 21, 1970 J. K. HSIAO 3,508,071

BALANCED MAGNETIC LOGIC CIRCUITS

Filed Oct. 9, 1967 3 Sheets-Sheet 1

| $X_1$ | $X_2$ | LEG SWITCHED |
|---|---|---|
| 0 | 0 | 136 |
| 0 | 1 | 132 |
| 1 | 0 | 128 |
| 1 | 1 | 124 |

INVENTOR
J. K. HSIAO
BY R C Lipton
ATTORNEY

April 21, 1970 J. K. HSIAO 3,508,071

BALANCED MAGNETIC LOGIC CIRCUITS

Filed Oct. 9, 1967 3 Sheets-Sheet 3

United States Patent Office 3,508,071

Patented Apr. 21, 1970

3,508,071

BALANCED MAGNETIC LOGIC CIRCUITS

James K. Hsiao, Oxon Hill, Md., assignor to Bell Telephone Laboratories, Incorporated, Murray Hill, N.J., a corporation of New York Filed Oct. 9, 1967, Ser. No. 673,694
Int. Cl. H03k 17/82
U.S. Cl. 307—88 17 Claims

ABSTRACT OF THE DISCLOSURE

"OR" functions and "AND" functions of $n$ input variables are realized by utilizing a balanced magnetic circuit element having $n+1$ legs. The elemental structure comprises a closed loop magnetic core including a drive leg in parallel with a shunt leg, two cross legs, one of which includes a plurality of branch legs branching from the long axis thereof, and a completing leg joining the terminations of the branch legs and cross legs. A drive winding and a reset winding are coupled to the drive leg and the drive and shunt legs, respectively. Input windings and an output winding may be coupled to various of the branch legs and the cross legs from which they branch to provide either the logical "AND" function or "OR" function of externally-applied input signals.

BACKGROUND OF THE INVENTION

Field of the invention

This invention relates to magnetic circuits and more particularly to balanced magnetic circuits for generating logical functions of a plurality of inputs.

Description of the prior art

Magnetic elements capable of performing logic operations are well known in the prior art. The ferromagnetics, of which such elements are formed, display substantially rectangular hysteresis characteristics and thus exhibit two maximum remanent stable magnetic states. Different parts of a single element may be made to simultaneously exhibit different remanent conditions (depending on the structure of the element). These conditions are established by applying appropriate magnetomotive forces to the element. Various combinations of applied magnetomotive forces representing various inputs establish different remanent conditions in the element. The different conditions are then employed to represent different logical functions of the inputs. By appropriately connecting output circuits to the element, the different remanent conditions and thus the different logical functions of the inputs can be detected.

Prior art magnetic elements used for realizing Boolean functions of $n$ input variables oftentimes comprise a $2^n$-leg structure. For example, in the reference, Newhall, E. E., "The Use of Balanced Magnetic Circuits to Construct Digital Controllers," I.E.E.E. Transactions on Communications and Electronics, November 1964, pages 837–842, a four-leg logic element capable of generating all functions of two variables is disclosed. The element consists of four equal length parallel paths or legs each pair of which is joined to form two other legs which are in turn perpendicularly connected to two legs which are coupled to flux sources. The element includes additional legs formed to complete the structure into a closed loop magnetic core. Input windings representing the two input variables are coupled to the four parallel legs and to the two legs formed from these legs in such a manner that various pulsing of the input windings causes the normal flux distribution present in the four parallel legs to be shifted to new patterns. The various new patterns, of course, represent the various Boolean or logical functions of the two input variables. Any desired Boolean function of two variables can be realized with this element provided that the input windings are suitably coupled to the flux paths of the structure.

Since fabrication of the magnetic elements is an important cost in producing magnetic circuits, reduction of the number of flux paths or legs in the elements would appear desirable.

SUMMARY OF THE INVENTION

It is an object of the present invention, in view of the above-described prior art, to provide a new and simplified magnetic structure for performing logical operations.

It is another object of the present invention to provide a magnetic structure having fewer flux legs or flux paths to achieve such logical operations.

It is still another object of this invention to provide an $(n+1)$-leg magnetic structure for generating certain Boolean functions of $n$-variables.

These and other objects are realized in an illustrative embodiment generally comprising a closed loop ferrite magnetic structure displaying substantially rectangular hysteresis characteristics and including a drive leg in parallel with a shunt leg, a first and second cross leg each connected to opposite ends of the drive and shunt legs, the second cross leg including $n$ branch legs branching from the long axis thereof, and a completing leg joining the terminations of the branch legs and cross legs. The $n$ branch legs together with the second cross leg compose $n+1$ flux switching legs to which $n$ input windings and an output winding may be coupled to generate the logical "AND" function or "OR" function of input signals applied over the input windings.

More particularly, in the illustrative embodiment, a closed-loop magnetic core includes a drive leg of one unit cross-sectional area in parallel with a shunt leg of $n$ units cross-sectional area where $n$ is any integer $\geq 2$, a first cross leg of $n+1$ units cross-sectional area, and a second cross leg which branches into two parallel legs, the first being one unit in cross-sectional area and the second (which may be considered a common leg) being $n$ units in cross-sectional area. The common branch leg, in turn, branches into two parallel legs, the first again being one unit in cross-sectional area and the second (which may be considered the continuation of the common leg) being $n-1$ units in cross-sectional area. This branching continues until $n+1$ branch legs of one unit cross-sectional area are obtained. All such branch legs terminate in a magnetic member of $n+1$ units cross-sectional area which is joined to the first cross leg thereby completing the magnetic path.

Coupled to each branch leg together with the common leg is one of $n$ input windings linking each branch leg in opposite polarity to the common leg. An output winding is coupled to the branch legs or common leg in either of two ways to provide an output representing either the logical "OR" function or the logical "AND" function of input signals applied over the input windings. A reset pulse source coupled to the drive and shunt legs via a reset windings, is provided to saturate the core to a remanent hysteresis state and to generate an output on the output winding. A drive pulse source is coupled via a drive winding to the drive leg to switch the flux in the drive leg to an orientation opposite that existing in the leg when the core is saturated, thereby enabling very small input pulses applied over the input windings to switch the direction of the flux in a particular one of the branch legs or the common leg. The particular leg switched is dependent upon the combination of signals applied over the input windings.

BRIEF DESCRIPTION OF THE DRAWING

A complete understanding of the present invention and of the above and other objects and advantages thereof may be gained from a consideration of the following detailed description of a specific illustrative embodiment presented hereinbelow in connection with the accompanying drawing described as follows.

DETAILED DESCRIPTION

Figure 1A:
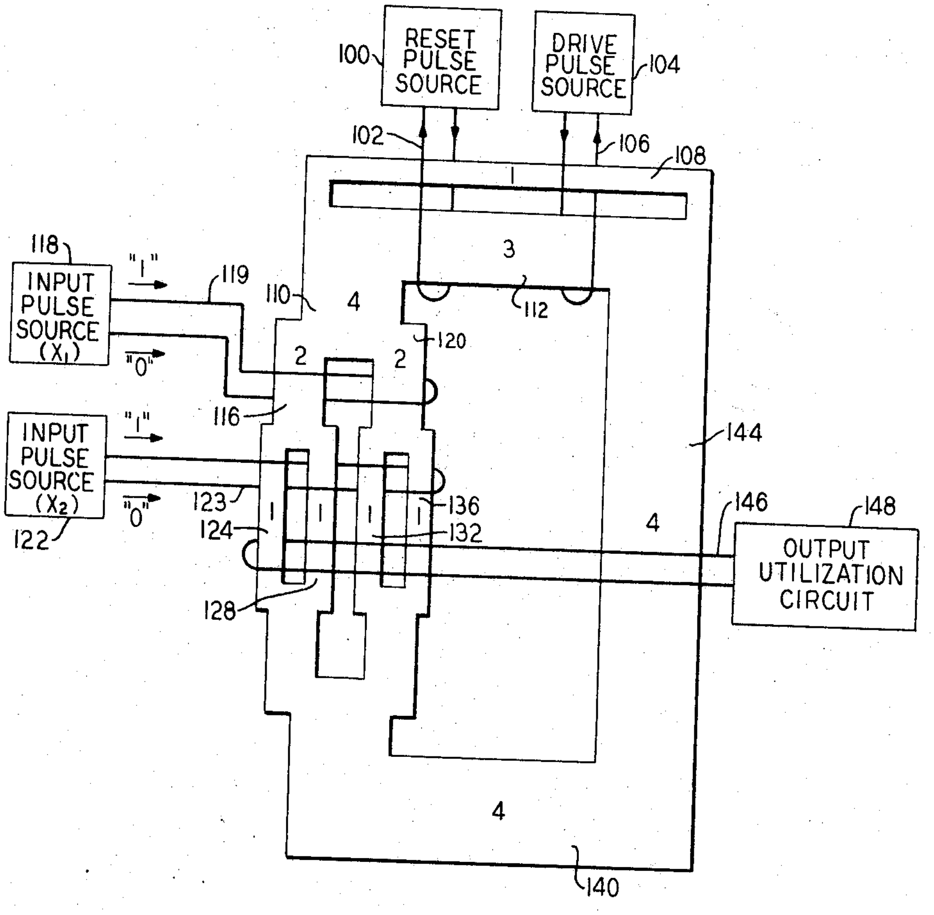
FIG. 1A PRIOR ART
FIG. 1A shows a prior art four-leg magnetic structure for generating the logical "AND" function of two input variables.

A prior art four-leg balanced magnetic structure (as shown in FIG. 1A) will be utilized in describing the principles and operation of balanced magnetic circuit elements. (A structure will be identified as an $n$-leg structure if it comprises $n$ flux switching legs each of which are of one unit cross-sectional area. This identification will become apparent as the FIG. 1A structure is described.) The structure shown in FIG. 1A comprises a closed-loop magnetic core including a drive leg 108 of one unit cross-sectional area (the cross-sectional area is indicated by the numeral on the leg), a shunt leg 112 of three units cross-sectional area, two cross legs 110 and 144 each of four units cross-sectional area, and a completing leg 140, also of four units cross-sectional area. The leg 110 is further divided into two branching legs 116 and 120 each of two units cross-sectional area, and each of which are further divided into two branch legs each of which are one unit in cross-sectional area. These branching legs of one unit cross-sectional area will hereafter be referred to as flux switching legs. Fixing the cross-sectional area of the component legs limits the magnetic flux carrying capacity of the legs to an amount proportional to the cross-sectional area.

A winding 102 is inductively coupled to the drive and shunt legs 108 and 112 in like polarity and is connected to a reset pulse source 100. A winding 106 is inductively coupled to the drive and shunt legs 108 and 112 in opposite polarity and is connected to a drive pulse source 104. A conductor 119 is coupled in an opposite sense to each of legs 116 and 120 and is connected to an input pulse source 118 representing an input variable $x_1$. A conductor 123 is coupled in like sense to legs 124 and 132 and in an opposite sense therefrom to legs 128 and 136 and is connected to an input pulse source 122 representing a second input variable $x_2$. The pulse sources 100, 104, 118, and 122 each may comprise any pulse source well known in the art suitable for providing the necessary pulses as described herein.

Figure 1B:
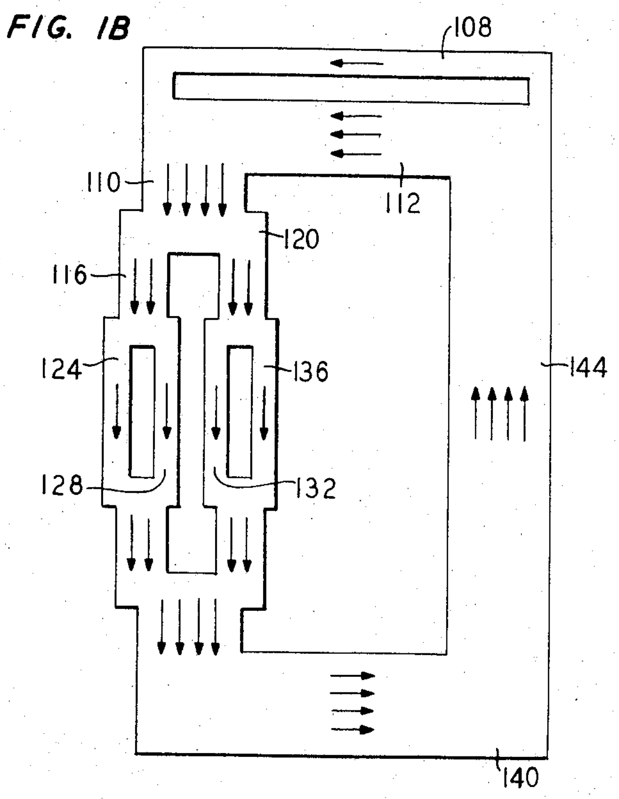
FIGS. 1B and 1C show magnetic flux patterns generated in the FIG. 1A structure.

Energizing winding 102 by the reset pulse source 100 creates a magnetomotive source which causes saturation of the FIG. 1A structure as shown in FIG. 1B. That is, a magnetic flux pattern in a counterclockwise direction is established as shown by the arrows in FIG. 1B. Each arrow indicates one unit of flux. Thus, if a leg shows three arrows, it indicates that that leg is carrying three units of flux in the direction shown. Pulsing the winding 102 and thus saturating the structure causes any residual flux directed upward in any of the flux switching legs to be switched downward.

When the winding 106 is energized by the drive pulse source 104 thereby inducing a drive flux in leg 108, a magnetomotive force is applied equally to the legs 116 and 120 and thereby equally to the flux switching legs 124, 128, 132, and 136. The magnetomotive force is applied equally because each set of parallel legs is of equal cross-sectional area and thus of equal magnetic reluctance. The equal reluctance flux switching legs may be said to be "balanced" with respect to the available path presented therethrough to the drive flux induced in the drive leg 108. (This is the reason for the terminology "balanced magnetic circuits.") In order for the drive flux generated by pulsing winding 106 to close through any selected one of the four flux switching legs 124, 128, 132, and 136, it is only necessary that a countermagnetomotive force be applied to each nonselected leg. Only a relatively small countermagnetomotive force applied to each nonselected leg is needed to "tip the scale" in favor of the selected leg for the applied drive flux.

Figure 1C:
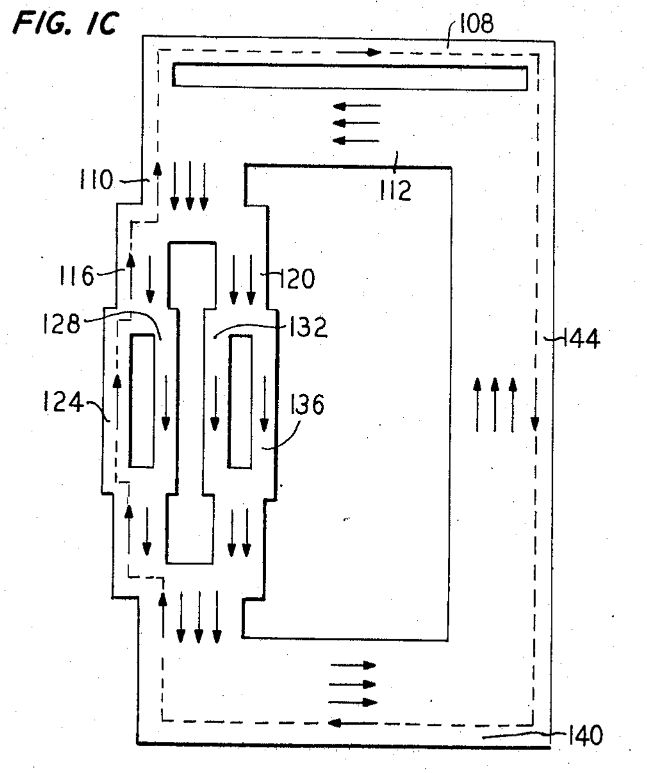

Thus, if windings 119 and 123 are pulsed with a "1" simultaneously with the pulsing of winding 106, the flux of leg 124 is switched upward. One unit of flux in each of legs 140 and 144 is also switched as shown in FIG. 1C, thus completing flux closure in the structure. Switching the flux in leg 124 induces a voltage in the output winding 146. Subsequent pulsing of the winding 102 by the reset pulse source 100 causes the flux of leg 124 to again switch downward, thereby inducing a voltage in the output winding 146 of opposite polarity from the previously induced voltage. Either this or the previously induced voltage can be utilized by an output utilization circuit 148 as the logical AND function of the inputs "1" of the input sources 118 and 122. In this manner, the four-leg structure of FIG. 1A can be used to generate the logical AND function of the two input variables $x_1$ and $x_2$. Other output functions of the two input variables or pulse sources can likewise be generated as shown in the tabulation at the bottom of FIG. 1A by coupling the output conductor 146 to the appropriate one of the flux switching legs.

Figure 2A:
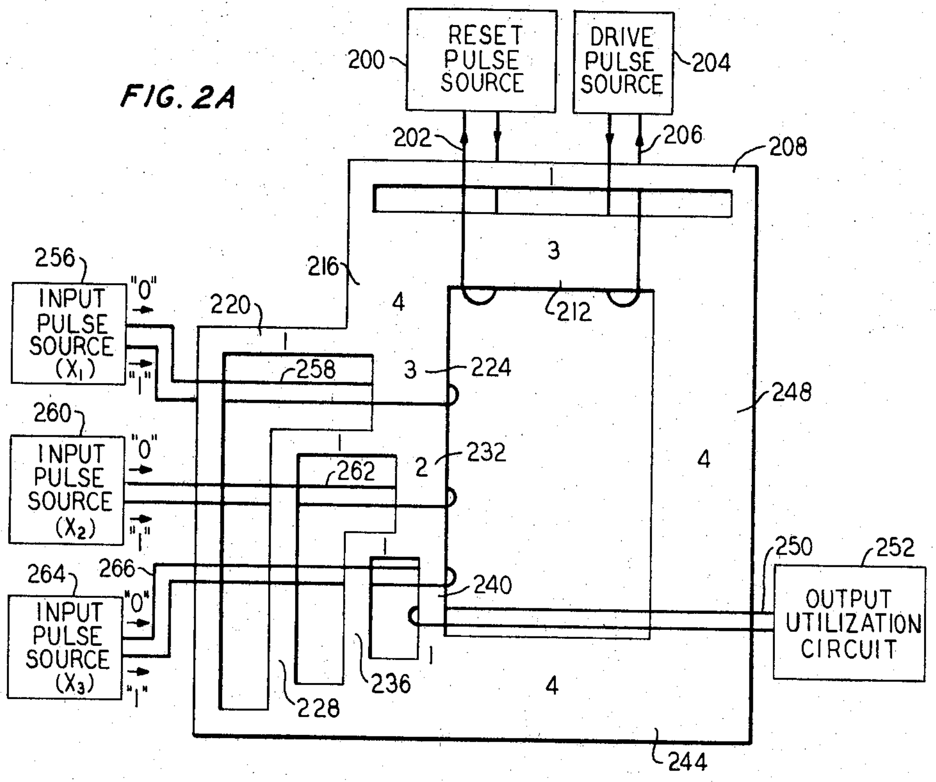
FIG. 2A shows a four-leg magnetic structure made in accordance with the principles of the present invention for generating the logical "AND" function of three input variables.

FIG. 2A shows an embodiment of applicant's invention for generating the logical AND function of three input variables $x_1$, $x_2$, and $x_3$. The FIG. 2A structure comprises a four-leg balanced magnetic element including a drive leg 208 of one unit cross-sectional area (the cross-sectional area is indicated on each leg), a shunt leg 212 of three units cross-sectional area, two cross legs 216 and 248 each of four units cross-sectional area and a completing leg 244 also of four units cross-sectional area. The cross leg 216 is divided into two legs 220 and 224 of one unit and three units cross-sectional area, respectively. Leg 224 is further divided into two legs 228 and 232 of one unit and two units cross-sectional area, respectively. Finally, leg 232 is divided into two legs 236 and 240 each of one-unit cross-sectional area.

A reset pulse source 200 and drive pulse source 204 are each coupled to the drive and shunt legs 208 and 212 as shown in FIG. 2A. An input winding 258 is coupled in opposite sense to the branch or flux switching legs 220 and 224 and is connected to an input pulse source 256, representing an input variable $x_1$. An input winding 262 is coupled in opposite sense to the flux switching legs 228 and 232 and is connected to an input pulse source 260 representing an input variable $x_3$. Finally, a winding 266 is coupled in opposite sense to legs 236 and 240 and is connected to an input pulse source 264 representing an input variable $x_3$. An output winding 250 is coupled to leg 240 and is connected to an output utilization circuit 252.

Figure 2B:
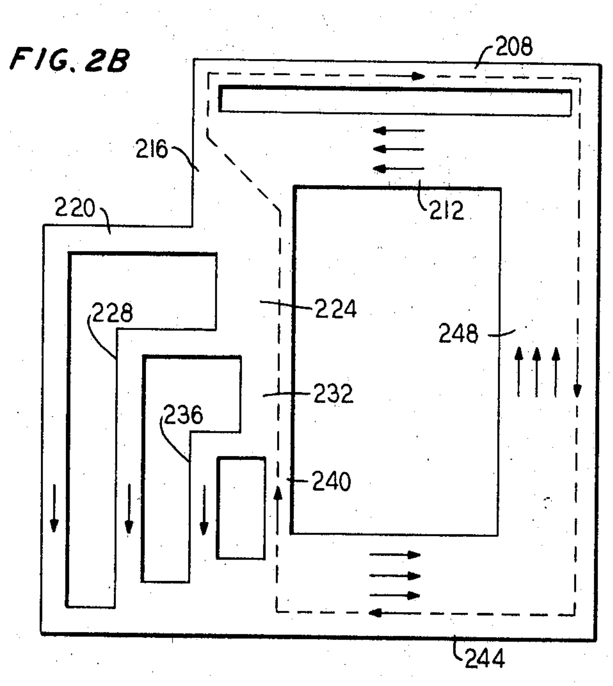
FIG. 2B shows a magnetic flux pattern generated in the FIG. 2A structure.

Energizing winding 202 by the reset pulse source 200 causes the four-leg structure of FIG. 2A to saturate with the magnetic flux oriented in a counterclockwise direction. Pulsing various of the input windings 258, 262, and 266 simultaneously with the energization of the drive winding 206 causes a particular one of the flux switching legs 220, 228, 236, or 240 to switch upward. If all three of the input windings are pulsed with a "1" (as indicated by the arrows on the windings) when the drive winding 206 is pulsed, leg 240 is caused to switch upward. The resulting flux pattern of the structure in this case is shown in FIG. 2B. Switching of leg 240, of course, induces a voltage in the output winding 250 thereby indicating to the output utilization circuit 252 that all three input windings have been pulsed with a "1." (It is assumed that input pulses are applied to the input windings simultaneously and that either a "0" or "1" is always applied. That is, if any input winding is pulsed, all are pulsed with either a "0" or a "1.") Pulsing winding 202 thereafter causes the flux in leg 240 to switch downward and a voltage to be induced in winding 250. In this manner, the logical "AND" function of the input variables $x_1$, $x_2$, and $x_3$ are generated with a four-leg balanced magnetic element.

The FIG. 2A structure can also be utilized to generate the logical "OR" function of the three input variables $x_1$, $x_2$, and $x_3$. In this case, however, each of the input windings would have to be rewound in a sense opposite that which is shown in the drawing. This can be visualized by considering the "1" inputs as being "0" inputs and vice versa. In addition, the output winding would be rewound so as to be coupled in like sense to legs 220, 228, and 236.

Considering the FIG. 2A structure as being wound as described above, then, for example, if the input pulse source 260 pulsed a "1" while the input pulse source 256 and 264 pulsed "0's" simultaneously with the pulsing of winding 206 by the drive pulse source 204, then leg 228 would be switched upward thereby inducing a voltage in the output winding. Subsequent pulsing of winding 202 by the reset pulse source 200 would again switch the flux of leg 228 to a downward direction to again induce a voltage in the output winding. Either this or the first induced voltage could be utilized by the output utilization circuit as an indication of a logical "OR" output function of the "1" inputs.

It is apparent from the above that the logical "OR" and "AND" functions of any $n$ input variables can be realized with a single $(n+1)$-leg balanced magnetic element.

The foregoing described circuits are to be understood as comprising only illustrative embodiments of the present invention. Specific elements and values of these elements necessary to the operation of the invention may readily be determined by one skilled in the art. In addition, various and numerous other arrangements may also be devised by one skilled in the art without departing from the spirit of this invention.

What is claimed is:

1. A magnetic logic circuit comprising a multi-leg magnetic core, said core including a drive leg, a shunt leg, a first and second cross leg and a completing leg, means joining said drive leg in parallel with said shunt leg and perpendicular to each of said cross legs, said first cross leg comprising a plurality of branch legs branching from the long axis thereof, said first cross leg and said branch legs terminating in said completing leg and said completing leg being joined to said second cross leg, a plurality of input windings each coupled to said first cross leg and a different one of said branch legs for inducing remanent magnetizations in opposite directions in said first cross leg and said branch leg, a drive winding coupled to said drive leg, and a reset winding coupled to said drive leg and said shunt leg.

2. A magnetic logic circuit comprising an $(n+1)$—leg balanced magnetic structure, said structure comprising a drive leg of one unit cross-sectional area, a shunt leg of $n$ units cross-sectional area connected in parallel to said drive leg, a first and second cross leg each of $n+1$ units cross-sectional area and perpendicularly connected to opposite ends of said drive and shunt leg, said first cross leg branching into two parallel legs, one of which is one unit in cross-sectional area and the other of which is $n$ units in cross-sectional area, said leg of $n$ units cross-sectional area, in turn, branching into two parallel legs, one of which is one unit in cross-sectional area and the other of which is $n-1$ units in cross-sectional area, said branching continuing until $n+1$ branch legs each of one unit cross-sectional area are obtained, a completing leg of $n+1$ units cross-sectional area joining the terminations of said branch legs and said second cross leg, a reset pulse source having a winding coupled to said drive and shunt legs in like polarity for saturating said structure to a remanent hysteresis condition, and means for generating magnetic flux reversals in certain of said legs.

3. A circuit as in claim 2 wherein said means for generating flux reversals comprises a drive pulse source and associated drive winding coupled to said drive and shunt legs in opposite polarity for switching the direction of magnetic flux in said drive leg from that existing during the condition of saturation, and input pulse sources and associated input windings each coupled to a different pair of said branching parallel legs for switching the direction of flux in a particular one of said branch legs from that existing during the condition of saturation.

4. A circuit as in claim 3 further including an output utilization means having a winding coupled to selected ones of said branch legs for detecting flux reversals in said selected legs.

5. A circuit as in claim 2 wherein said means for generating flux reversals comprises a drive winding coupled to said drive leg and shunt leg in opposite polarity and connected to a drive pulse source for reversing the flux direction in said drive leg from that existing during saturation, and $n$ input windings, each coupled to a different pair of said branching parallel legs and each connected to an input pulse source capable of generating two pulses of opposite polarity, for reversing the direction of flux in a particular branch leg when all $n$ input windings are pulsed with input pulses of the same polarity simultaneously with the reversal of flux in said drive leg.

6. A circuit as in claim 5 further comprising an output winding coupled to said particular branch leg and connected to an output utilization means for detecting the flux reversals in said leg.

7. A circuit as in claim 2 wherein said means for generating flux reversals comprises a drive winding coupled to said drive leg and shunt leg in opposite polarity and connected to a drive pulse source for reversing the flux direction in said drive leg from that existing during saturation, and $n$ input windings, each coupled to a different pair of said branching parallel legs and each connected to an input pulse source capable of generating two pulses of opposite polarity, for reversing the direction of flux in any but a specific one of said $n+1$ branch legs when one or more of said input windings are pulsed with input pulses of the same polarity simultaneously with the reversal of flux in said drive leg.

8. A circuit as in claim 7 further comprising an output winding coupled to all but said specific branch leg and connected to an output utilization means for detecting the flux reversals in all but said specific leg.

9. A balanced magnetic circuit including a magnetic structure comprising a drive leg in parallel with a shunt leg, a first and second cross leg, said first cross leg comprising $n$ legs branching from the long axis thereof, where $n \leqslant 2$, and a completing leg connecting the terminations of said branch legs and said cross legs.

10. A circuit as in claim 9 further comprising means for inducing saturation of said magnetic structure, means for inducing a drive flux in said drive leg, and $n$ input means for inducing flux reversals in certain of said branch legs and said cross legs.

11. A circuit as in claim 10 wherein said $n$ input means comprises $n$ windings each coupled to a different one of said branch legs and said first cross leg, and means for applying input pulses to each of said $n$ windings and for inducing a flux reversal in said first cross leg when pulses are applied to all of said $n$ windings simultaneously with the inducement of a drive flux in said drive leg.

12. A circuit as in claim 11 further comprising an output means for detecting said flux reversal in said first cross leg.

13. A circuit as in claim 10 wherein said $n$ input means comprises $n$ windings each coupled to a different one of said branch legs and said first cross leg, and means for applying input pulses to each of said $n$ windings and for inducing flux reversals in different ones of said $n$ branch legs when pulses are applied to one or more of said $n$ windings simultaneously with the inducement of a drive flux in said drive leg.

14. A circuit as in claim 13 further comprising an output means for detecting said flux reversals in said $n$ branch legs.

15. In a multi-leg balanced magnetic structure, a cross leg comprising a common leg for providing a magnetic path and a plurality of branch legs branching from said common leg and providing magnetic paths parallel thereto, each of said branch legs being one unit in cross-sectional area and the cross-sectional area of said common leg being reduced one unit for each branch leg in parallel to the particular reduced portion of the common leg.

16. A combination as in claim 15 further comprising means for causing saturation of said magnetic structure and means for causing magnetic flux reversals in certain of said branch legs and said common leg.

17. A combination as in claim 16 wherein said means for causing magnetic flux reversals includes a plurality of windings, each of said windings coupled to said common leg and a different one of said branch legs.

References Cited

UNITED STATES PATENTS

| | | | |
|---|---|---|---|
| 3,116,421 | 12/1963 | Newhall | 307—88 |
| 3,293,621 | 12/1966 | Newhall | 340—174 |
| 3,328,780 | 6/1967 | Newhall et al. | 340—174 |
| 3,376,562 | 4/1968 | Newhall et al. | 340—174 |
| 3,407,307 | 10/1968 | Minnick | 307—88 |

STANLEY M. URYNOWICZ, Jr., Primary Examiner